3,545,961
REFINING OF COPPER
Charles Arentzen and John T. O'Donnell, Anaconda, Mont., assignors to The Anaconda Company, New York, N.Y., a corporation of Montana
No Drawing. Filed Nov. 25, 1966, Ser. No. 596,812
Int. Cl. C22b $15/14$
U.S. Cl. 75—76                    4 Claims

ABSTRACT OF THE DISCLOSURE

A process is provided for refining molten copper containing copper oxide which comprises adding to the molten copper sufficient cuprous sulfide to react with substantially all the copper oxide therein. The molten metal is then subjected to a subatmospheric pressure until substantially all the sulfur dioxide formed by reaction of the copper oxide with the cuprous sulfide has been removed. The subatmospheric pressure may be applied by immersing into a bath of the molten copper one end of a pipe which is connected at its other end to a source of subatmospheric pressure.

---

This invention relates to the refining of copper and, more particularly, to the production of metallic copper from the reduction of blister copper containing copper oxide using $Cu_2S$ for the reduction operation.

Known copper ore deposits are, for the most part, composed of copper sulfides mixed with iron sulfides. Present extraction processes involve first crushing the ore to fine size thereby liberating the copper-bearing minerals of the ore from the gangue. The copper sulfide of the crushed ore is next concentrated in a flotation operation in which the flotation reagent is one which will float the copper sulfide. The flotation concentrates, or copper concentrates, which in addition to copper sulfide contain certain other components of the ore, mainly silica and iron sulfides, are dried and roasted in a roasting furnace to oxidize the iron sulfide and to eliminate a consideration portion of the volatile materials. The product of the roasting operation, known as calcine, is a dry, finely-divided solid composed chiefly of copper sulfide, iron sulfide, some iron oxide, and the gangue originally present in the concentrate. The calcine is smelted with silica and lime (a slag-forming base) in a reverberatory furnace to produce matte and slag. The matte is composed essentially of copper sulfide and iron sulfide. The slag contains the other constituents of the charge, mainly iron oxide and silica. Since the molten matte is not miscible with the molten slag, the matte and the slag readily separate in two distinct layers or phases, the slag floating on top of the matte. The slag is drawn off and discarded. The matte, to which some silica has been added, is treated further in a converter by blowing air through it to oxidize the iron sulfide and to reduce the copper sulfide to metallic copper. More specifically, the air first changes the iron sulfide to iron oxide which combines with the silica to form a slag. After pouring off this slag, continued blowing results in changing part of the copper sulfide to copper oxide which reacts with the remaining copper sulfide to produce metallic copper. This metallic copper, known, when cast, as blister copper, is of approximately 99% purity.

Should a copper of greater purity be desired, the blister copper is further refined in an electrolytic refining cell. The product of electrolytic refining, known as cathode copper, is virtually 100% pure, the main impurity being sulfur from the sulfate electrolyte. To eliminate this sulfur and minor other impurities and to prepare the copper for casting into commercially acceptable shapes, it is fire refined in a reverberatory-type furnace. The furnace is strongly fired until the charge has been melted and compressed air is then blown into the molten copper through an iron pipe inserted beneath its surface. Blowing is continued until the copper is substantially completely saturated with dissolved oxygen. This treatment oxidizes the sulfur to sulfur dioxide and the metal impurities to oxides which float on the surface. Sometimes, a small amount of silica is thrown on the charge to form a slag with these oxides. The slag is skimmed continuously until no more forms with continued blowing.

At the conclusion of blowing with air, several wooden poles are plunged beneath the surface of the molten copper frequently after first covering the surface with a layer of coke or charcoal. This treatment is called poling. The wood is at once subjected to destructive distillation and carbonization, and the hydrogenous distillation products react with copper oxide to form copper, water vapor, and carbon monoxide.

Poling is continued until the oxygen content of the copper has been reduced to about 0.03%–0.05%. If the copper is underpoled—that is, if it is cast while still containing substantially more than 0.05% oxygen—the upper face of the cast shape shrinks considerably upon cooling and solidifying. This shrunken upper surface is objectionable because it must be cut off mechanically to make the cast shape easy to work with in subsequent fabricating operations. If the copper is overpoled to that the oxygen content is reduced considerably below 0.03%, so much gas is dissolved in the molten metal that, when it is then cast and begins to solidify, large bubbles are evolved. The solidified shape is exceedingly porous and is not satisfactory for subsequent commercial use.

When a sample of the copper shows a flat surface after solidifying, it is considered ready for casting, and poling is discontinued. Copper that solidifies with a substantially flat upper surface is called flat set copper, or tough pitch copper, and the metal is said to have been poled to pitch.

The present invention contemplates a process whereby flat set copper may be produced by refining blister copper using $Cu_2S$ for the reduction operation. According to the process of the present invention, the blister copper containing copper oxide is initially melted and then $Cu_2S$ is introduced into the molten bath to react with the copper oxide. The resultant bath is subjected to degassing at a subatmospheric pressure to remove the $SO_2$ generated therefrom and other impurities including AS and dissolved $SO_2$. The refined copper is then cast into a flat set.

Advantageously, the blister copper is fire refined to produce a molten bath saturated with copper oxide. The amount of $Cu_2S$ used is a stoichiometric amount for the removal of the oxides according to the reaction represented by the formula:

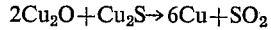

$$2Cu_2O + Cu_2S \rightarrow 6Cu + SO_2$$

The $SO_2$ generated is partially dissolved in the molten metal and partially vaporized. The removal of the dissolved $SO_2$ may be accomplished by subjecting the molten bath to vacuum degassing at a subatmospheric pressure below about 20 inches of Hg.

Further to illustrate this invention a specific example is described below. In this example, a 50 kva. electric arc furnace is used to melt 38.5 lbs. of copper saturated with $Cu_2O$ (about 10%). About 2.14 lbs. of $Cu_2S$ is added to the molten metal. After about half an hour, a 1½ inch diameter stainless steel tube of which one end is connected to a vacuum pump the other immersed in the molten metal, is used for degassing at a pressure about 17″ Hg.

Additional 2 lbs. of Cu saturated with $Cu_2O$ is added to the arc furnace and the resultant molten metal is again subjected to degassing at 18.2″ Hg vacuum.

The cycle of copper oxide addition and degassing is repeated two more times adding 4.45 lbs. and 3.00 lbs. at a subatmospheric pressure of 18.2″ Hg to 18.5″ Hg, respectively. The total amount of Cu+saturated $Cu_2O$ is 50.40 lbs. A total of 44 minutes is used for degassing. The copper produced is a flat set copper.

From the above example, it is apparent that vacuum degassing will remove dissolved $SO_2$ and produces a flat set copper. The use of an immersed tubing for degassing is also proven to be effective. It is, however, understood that using other forms of vacuum degassing may be suitable. The degree of $SO_2$ removal may be determined by the vacuum attained.

We claim:

1. A process for fire refining molten blister copper which comprises treating the molten blister copper to produce a bath of molten copper essentially saturated with copper oxide, then adding to the molten copper bath at least sufficient cuprous sulfide to react with substantially all the copper oxide therein, then subjecting the molten metal to a subatmospheric pressure until substantially all the sulfur dioxide formed by reaction of the copper oxide with the cuprous sulfide has been removed, and recovering the resulting refined copper.

2. A process according to claim 1, wherein additional copper oxide is added to the melt after it has been subjected to the subatmospheric pressure treatment, and the melt is then again subjected to the subatmospheric pressure for removal of the sulfur dioxide.

3. A process according to claim 1 wherein a bath of the molten metal is subjected to subatmospheric pressure by immersing into it one end of a pipe which is connected at its other end to a source of subatmospheric pressure.

4. A process according to claim 1 wherein the subatmospheric pressure is below 20 inches of mercury.

References Cited

UNITED STATES PATENTS

| | | | |
|---|---|---|---|
| 3,114,628 | 12/1963 | Redmond | 75—76 X |
| 3,351,462 | 11/1967 | Arentzen | 75—10 X |

OTHER REFERENCES

Morse, Richard S., High Vacuum Technology, In Industrial & Engineering Chemistry, 39(9), p. 1069, September 1947.

Stauffer, Robert A., Vacuum Melting and Casting of Copper, in Cambridge High Vacuum Symposium, National Research Corp., p. 820, Oct. 30–31, 1947.

L. DEWAYNE RUTLEDGE, Primary Examiner

J. E. LEGRU, Assistant Examiner

U.S. Cl. X.R.

75—93